(12) United States Patent
Abe et al.

(10) Patent No.: US 8,137,542 B2
(45) Date of Patent: Mar. 20, 2012

(54) WATER TREATMENT SYSTEM

(75) Inventors: Norimitsu Abe, Kawasaki (JP); Seiichi Murayama, Fuchu (JP); Takeshi Ide, Kokubunji (JP); Akira Morikawa, Kitakatsushika-gun (JP); Shojiro Tamaki, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 599 days.

(21) Appl. No.: 12/340,321

(22) Filed: Dec. 19, 2008

(65) Prior Publication Data

US 2009/0166276 A1   Jul. 2, 2009

(30) Foreign Application Priority Data

Dec. 27, 2007 (JP) ................................. 2007-338201

(51) Int. Cl.
 *B01D 65/02* (2006.01)
(52) U.S. Cl. ........ 210/138; 210/139; 210/141; 210/192; 210/257.2; 210/258; 210/259; 210/321.69
(58) Field of Classification Search .................. 210/108, 210/138, 139, 141, 192, 195.1, 195.2, 202, 210/203, 257.2, 258, 259, 321.69, 512.1, 210/513, 636, 702, 805, 424–428
See application file for complete search history.

(56) References Cited

U.S. PATENT DOCUMENTS

| | | | | |
|---|---|---|---|---|
| 7,291,267 B2 * | 11/2007 | Johnson et al. | ......... | 210/321.69 |
| 2005/0170492 A1 * | 8/2005 | Johnson et al. | ............ | 435/287.1 |
| 2005/0269254 A1 * | 12/2005 | Roitman | ........................ | 210/252 |
| 2006/0219630 A1 * | 10/2006 | Abe et al. | ...................... | 210/600 |
| 2007/0045197 A1 * | 3/2007 | Ogut et al. | ..................... | 210/748 |
| 2007/0181496 A1 * | 8/2007 | Zuback | .......................... | 210/636 |
| 2008/0179244 A1 * | 7/2008 | Morgan et al. | ................ | 210/636 |
| 2008/0203004 A1 | 8/2008 | Abe et al. | | |
| 2009/0107915 A1 * | 4/2009 | Skinner et al. | ................ | 210/636 |

FOREIGN PATENT DOCUMENTS

| | | |
|---|---|---|
| JP | 11-90432 | 4/1999 |
| JP | 2004-066061 | 3/2004 |
| JP | 2007-144386 | 6/2007 |

* cited by examiner

*Primary Examiner* — Joseph Drodge

(74) *Attorney, Agent, or Firm* — Finnegan, Henderson, Farabow, Garrett & Dunner, L.L.P.

(57) ABSTRACT

Disclosed is a water treatment system including a raw water tank, a module which includes a filtration membrane, a feed pump, a filtered water tank, a backwash pump which flows filtered water backward from the filtered water tank to the module, a valve and a channel which switch the direction of the water flow between the forward and reverse directions, a controller which suspends the supply of raw water from the raw water tank to the module, switches the valve and channel to the reverse direction, makes the backwash pump to supply filtered water from the filtered water tank to the module thereby backwashing the filtration membrane, and washing drainage treatment line including which treats backwashing drainage generated by backwashing of the filtration membrane, and returns the water to the raw water tank.

5 Claims, 5 Drawing Sheets

WATER TREATMENT SYSTEM

CROSS-REFERENCE TO RELATED APPLICATIONS

This application is based upon and claims the benefit of priority from prior Japanese Patent Application No. 2007-338201, filed Dec. 27, 2007, the entire contents of which are incorporated herein by reference.

BACKGROUND OF THE INVENTION

1. Field of the Invention

The present invention relates to a method for disinfecting drainage used for washing filtration membranes for purifying raw water such as groundwater or river water.

2. Description of the Related Art

Heretofore, in order to produce tap water or industrial water from raw water such as river water, lake water, and groundwater, filtration membranes have been widely used on their merits such as reliability and automatic operation. However, when water treatment equipment including a filtration membrane is operated for a long time, suspended solids in raw water adhere to the surface of the filtration membrane, which results in the decrease of the water permeation rate and water treatment capacity. More specifically, accumulation of solid contents and microorganisms (for example, *Cryptosporidium*, *Giardia*, fish eggs, algae, and *Escherichia coli*) increases the filtration pressure, which results in the decrease of the treatment capacity. Therefore, water purification with a filtration membrane requires backwashing or other operation every 30 minutes to 1 hour thereby washing the surface of the filtration membrane to remove the adhering suspended solids. As a result of this, drainage used for washing the filtration membrane contains suspended solids derived from the raw water at relatively high concentrations.

As described above, drainage used for washing filtration membranes contains various suspended solids derived from the raw water, and the suspended solids may contain concentrated infectious microorganisms, such as *Cryptosporidium* or *Giardia* which will not be deaden by a diluted chlorine sterilizer.

Heretofore, drainage used for washing filtration membranes is released untreated. Such discharge of wastewater containing infectious microorganisms is undesirable because it can cause recontamination of river water and others. In addition, water filtered through a filtration membrane is often used for backwashing, so that the discharge of drainage used for backwashing is undesirable from the viewpoint of effective utilization of raw water.

In order to solve the above-described problems, for example, JP-A KOKAI No. 11-90432 (Patent Document 1) suggests a method for water disinfection, including separating and concentrating suspended solids in washing drainage, and then disinfecting the concentrated water containing the separated suspended solids through, for example, ultraviolet irradiation method or heating method. JP-A KOKAI No. 2004-66061 (Patent Document 2) suggests another method for water disinfection, including reserving drainage in disinfection treatment equipment disposed out of a filtration membrane module, and disinfecting the drainage by disinfection treatment means such as ultraviolet light, followed by discharge.

However, the above-described disinfection methods for washing drainage described in Patent Documents 1 and 2 present the following problems.

Under the method described in Patent Document 1, the concentration of the suspended solids containing infectious microorganisms in the concentrated water is so high that transmission of ultraviolet light is inhibited, which results in the deterioration of the disinfection efficiency to inhibit reliable disinfection treatment.

Under the method described in Patent Document 2, suspended solids containing infectious microorganisms after separation and concentration with a filtration membrane are contained in the washing drainage at high concentrations, so that transmission of ultraviolet light through the water is inhibited, and the treated water is discharged in an insufficiently disinfected state, which may results in incomplete prevention of recontamination of rivers and the like. In addition, under the method, the drainage used for washing a filtration membrane is wholly discharged, which is undesirable from the viewpoint of effective utilization of water resources.

BRIEF SUMMARY OF THE INVENTION

The present invention has been made to solve the above-described problems, and is intended to provide a water treatment system for efficiently disinfecting drainage produced by backwashing during filtration membrane treatment to produce reusable water, thereby reducing the cost of water purification and improving the effective utilization ratio of raw water.

In the aspect of (1), a water treatment system for producing tap water or industrial water from raw water such as river water, lake water, and groundwater, comprises:

a raw water tank which stores raw water;

a filtration membrane module which receives raw water from the raw water tank and has a filtration membrane for separating and removing foreign substances from the raw water;

a feed pump which is provided between the raw water tank and the filtration membrane module, and feeds raw water from the raw water tank to the filtration membrane module;

a filtered water tank which receives and temporarily reserves filtered water transmitted through the filtration membrane of the filtration membrane module, and sends out the supernatant as treated water;

a backwash pump which is provided between the filtered water tank and the filtration membrane module, and flows filtered water backward from the filtered water tank to the separation membrane module;

valves and pipes which are provided between the filtered water tank and the filtration membrane module, and switch the direction of the water flow between the forward and reverse directions;

a control means for suspending the supply of raw water from the raw water tank to the filtration membrane module, switching the valve and pipes to the reverse direction, making the backwash pump to supply filtered water from the filtered water tank to the separation membrane module thereby backwashing the filtration membrane; and a washing drainage treatment means provided between the filtration membrane module and the raw water tank, for treating backwashing drainage generated by backwashing of the filtration membrane, and returning the water to the raw water tank. According to the aspect of (1), washing drainage used for backwashing process of a filtration membrane is purified and returned to a raw water tank, whereby the water resource is effectively reused.

In the aspect of (2), the washing drainage treatment means has a flocculation tank, a precipitator, and an ultraviolet irradiation reactor. According to the aspect of (3), the ultraviolet irradiation reactor includes ultraviolet lamps emitting ultraviolet light containing a wavelength of 253.7 nm. According to the aspects of (2) and (3), the washing drainage used for backwashing treatment of the filtration membrane is subjected to flocculation and precipitation treatment to separate and remove suspended solids, the supernatant water is subjected to ultraviolet irradiation, and the washing drainage is returned to the raw water tank via the washing drainage treatment system. As a result of this, efficient and reliable disinfection treatment is achieved with lower power consumption than the case where water containing suspended solids or concentrated water after separation and removal treatments is subjected to ultraviolet irradiation.

In the aspect of (4), the ultraviolet lamp contained in the ultraviolet irradiation reactor is accommodated in a protecting tube made of quartz glass for isolating and protecting the periphery of the tube from the outside fluid. According to the aspect of (4), the ultraviolet lamp is isolated from the fluid with the protecting tube, whereby the ultraviolet lamp is protected from any drag generated by a collision of a fluid with an object. In addition, the fluid and the ultraviolet lamp are electrically isolated, whereby the failure or breakage of the ultraviolet lamp is prevented to allow stable disinfection treatment.

In the aspect of (5), the washing drainage treatment means has a cyclonic solid-liquid separation device and an ultraviolet irradiation reactor. According to the aspect of (5), firstly, the cyclonic solid-liquid separation device physically separates and removes the suspended solids from the water, and then the water is disinfected by the ultraviolet irradiation reactor to improve the ultraviolet light transmittance of the treated water in the ultraviolet irradiation reactor. As a result of this, the whole of the treated water is uniformly irradiated with ultraviolet light, and waste of electric power used to generate ultraviolet light is eliminated.

In the aspect of (6), the washing drainage treatment means has a cyclonic ultraviolet irradiation reactor. According to the aspect of (6), physical separation and removal of suspended solids and water disinfection treatment are simultaneously carried out in the cyclonic ultraviolet irradiation reactor, whereby the treatment efficiency is improved.

In the aspect of (7), the washing drainage treatment system has a cyclonic ultraviolet irradiation reactor and a second ultraviolet irradiation reactor. According to the aspect of (7), disinfection treatment by the cyclonic ultraviolet irradiation reactor is followed by redisinfection treatment by the second ultraviolet irradiation reactor, whereby sufficient disinfection treatment effect is obtained.

In the aspect of (8), the ultraviolet irradiation reactor has a cleaning device for cleaning the outer surface of the ultraviolet lamp protecting tube. According to the aspect of (8), the cleaning device removes adhering matters from the outer surface of the protecting tube, whereby the deterioration of the ultraviolet irradiation dose is effectively prevented, and the disinfection treatment effect is maintained exceeding a certain level.

The aspect of (9) has a washing wastewater treatment means washing line which is branched from the line at the ejection side of the backwash pump, and merges with the incurrent line of the cyclonic ultraviolet irradiation reactor in the washing drainage treatment means bypassing the filtration membrane module. According to the aspect of (9), the drainage used for washing the washing drainage treatment means is merged with the backwashing drainage, and these drainages are collected and reused together, whereby the recycle utilization ratio of the drainages is further improved.

In the aspect of (10), the control means controls the time of washing with the washing drainages treatment means at least once after backwashing of the filtration membrane during the operation of membrane filtration. According to the aspect of (10), the control means receives time constant signals from the internal timer circuit, and the control means sends a command signal to the on-off valve and others once it knows the lapse of a certain period of time after backwashing, thereby carrying out washing operation for removing foreign substances adhering to the washing drainage treatment means, whereby the washing drainage treatment means is maintained in a clean state.

DETAILED DESCRIPTION OF THE INVENTION

Various embodiments of the present invention will be described below with reference to the accompanying drawings.

First Embodiment

Figure 1:
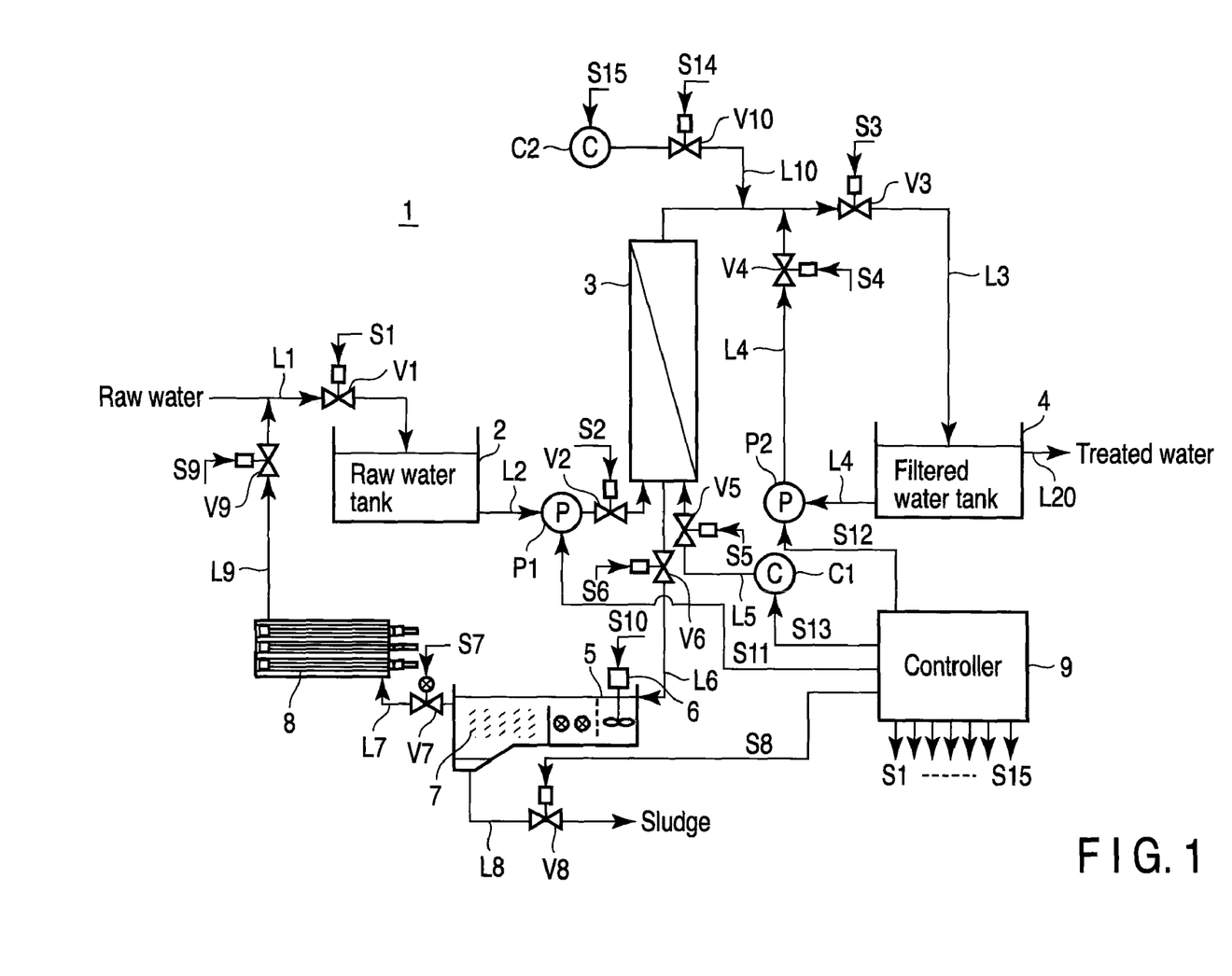
FIG. 1 is a block sectional view schematically showing the water treatment system according to a first embodiment of the present invention.

As shown in FIG. 1, a water treatment system 1 of the first embodiment includes a raw water tank 2, a membrane module 3, a filtered water tank 4, a flocculation tank 5, a the stirrer 6, a precipitator 7, an ultraviolet irradiation reactor 8, and a controller 9.

The raw water tank 2 is a reserve tank connected to a raw water supply source (not shown) via a line L1. The raw water to be treated (for example, river water) flows into the raw water tank 2 through the line L1. The raw water introducing line L1 has a flow rate control valve V1 controlled by the controller 9. A water outlet is provided at the bottom or near the bottom of the raw water tank 2. The water outlet communicates with the bottom of the membrane module 3 via a line L2. The line L2 has a feed pump (operation pump) P1 which feeds raw water from the raw water tank 2 to the membrane module 3. The line L2 has an on-off valve V2 which is controlled by the controller 9.

The membrane module 3 includes a filtration membrane within a standing cylindrical or square shaped vessel. The filtration membrane is composed of a polymer hollow fiber membrane or ceramic membrane having on its surface minute openings having a diameter of about 0.01 μm to 1.0 μm, and is supported by a plurality of supports at the edge. An outlet for taking out the filtered water is formed at the top of the vessel of the membrane module 3. The outlet is connected to the filtered water tank 4 via a line L3. The line L3 has an on-off valve V3 controlled by the controller 9.

The vessel bottom of the membrane module 3 is connected to the raw water supply line L2, as well as a compressed air blowing line L5 and a drainage treatment line L6. The compressed air blowing line L5 is used for removing foreign substances adhering to the membrane surface by blowing compressed air from a compressor C1 into the primary side of the membrane module 3 thereby diffusing the foreign substances through air strapping. The compressed air blowing line L5 has an on-off valve V5 controlled by the controller 9. A drainage treatment line L6 is used for reclaiming and reusing sludge and sewage discharged after washing the membrane module 3, and the details thereof will be described later.

The filtered water tank 4 has a predetermined volume and depth, and its upper portion has a water intake line L20 for transferring the supernatant of the filtered water as treated water to a water reserve tank (not shown). A backwash line L4 extends from the lower portion of the filtered water tank 4, and connects to the outlet line L3. The junction of the backwash line L4 and the outlet line L3 is located upstream of the on-off valve V3. The backwash line L4 has a backwash pump P2 controlled by the controller 9.

The outlet line L3 of the membrane module 3 is connected to another compressed air blowing line L10. The compressed air blowing line L10 is used for removing foreign substances adhering to the membrane surface by blowing compressed air from a second compressor C2 into the secondary side of the membrane module 3 thereby diffusing the foreign substances through air backwashing. The junction of the compressed air blowing the line L10 and the outlet line L3 is located upstream of the on-off valve V3. The compressed air blowing the line L10 has an on-off valve V10 controlled by the controller 9.

The wastewater treatment line L6 is further described below.

The drainage treatment line L6 is used to remove foreign substances (for example, sludge) dropped off from the membrane surface by backwashing from the bottom of the membrane module 3 periodically (for example, every 30 minutes). The drainage treatment line L6 is connected to the flocculation tank 5 via an on-off valve V6, and is further connected to the subsequent precipitator 7. The flocculation tank 5 and the precipitator 7 form an integrated one treatment tank, and are partitioned with a plurality of diaphragms which are partially opened. The flocculation tank 5 includes the propeller shaft stirrer 6 for thoroughly stirring the introduced sludge and sewage together with a predetermined amount of a flocculant (for example, polyaluminum chloride) injected from a flocculant injection device (not shown), thereby promoting the flocculation of the sludge. The precipitator 7 reserves the sludge and sewage thoroughly mixed with a flocculant in a steady state thereby flocculating and precipitating the sludge. The bottom of the precipitator 7 has a depression for retaining the sludge. A sludge extracting line L8 is connected to the lowermost portion of the depression. The line L8 has an on-off valve V8.

A supernatant extracting line L7 is provided at an upper portion of the precipitation tank 7, through which the supernatant after sedimentation of the solid contents is extracted from the precipitation tank 7. The supernatant extracting line L7 is connected to an ultraviolet irradiation reactor 8 via an on-off valve V7.

The ultraviolet irradiation reactor 8 is a sterilizer having the substantially same structure with the apparatus disclosed in FIG. 1 and its related description in Jpn. Pat. Appln. KOKAI Publication No. 2007-144386. The ultraviolet irradiation reactor 8 includes a plurality of ultraviolet lamps covered with a protecting tube made of transparent quartz glass, and disinfects the supernatant water (sewage) sent from the precipitator 7 by irradiation with ultraviolet light containing a wavelength of 253.7 nm. The outlet of the ultraviolet irradiation reactor 8 is connected to a return line L9. The return line L9 merges with the raw water introducing line L1 at the upstream of the flow rate control valve V1. The backwashing water is returned to the raw water tank 2 along the following path: membrane module 3→drainage treatment line L6→flocculation tank 5→precipitator 7→ultraviolet irradiation reactor 8→return line L9.

The controller 9 is further described below.

To the input side of the internal computer of the controller 9, various sensors (not shown) such as a flow rate sensor, a pressure sensor, a temperature sensor, a water level sensor, a turbidity sensor, and a concentration sensor are connected thereby inputting various detection signals. To the output side of the internal computer of the controller 9, various power switch circuits of the pump P, valve V, and compressor C are connected. Various process recipes required for the water treatment operation are stored as database in the memory of the internal computer. Once the detection signals from the various sensors are input to the controller 9, the controller 9 retrieves a necessary process recipe from the memory, and calculates various control quantities necessary for the water treatment operation based on the retrieved recipe and the input signals, and outputs signals corresponding to the calculated control quantities to the pump P, valve V, and compressor C. In this way, the whole of the water treatment system 1 is centrally controlled by the controller 9 containing a process computer.

In the next place, treatment of raw water using the water treatment system 1 of the present embodiment is described below.

In normal filtration operation, the controller 9 sends control signals S1, S2, S3, and S11 to the valve V1, V2, V3, and pump P1 to control their operations. It also sends a signal to a raw water pump upstream (not shown) thereby making the pump to draw up raw water such as groundwater, river water, or lake water from a water intake (not shown), and a predetermined amount of raw water is passed through the water introducing line L1 and reserved in the raw water tank 2. The raw water reserved in the raw water tank 2 is compressed to a predetermined pressure by a feed pump P1, and sent to the membrane module 3 through the line L2. The membrane module 3 contains a polymer hollow fiber membrane or ceramic membrane having on its surface minute openings having a diameter of about 0.01 μm to 1.0 μm. The water transmitted through the membrane module 3 is clean filtered water, a predetermined amount of which is reserved in the filtered water tank 4, and a part of the reserved water is passed through the backwash line L4 and used as backwashing water, and the remainder is passed through the line L20 and used as treated water.

After initiation of the filtration operation, backwashing operation is conducted at intervals of about 30 minutes to 1 hour. The timing of switching from the normal operation to the backwashing operation may be controlled by, as described below in the sixth embodiment, the controller 9 containing a timer circuit.

In the backwashing operation, the controller 9 sends signals S1, S2, S3, S4, S5, S11, S12, S13, S14, S15 to the pumps P1 and P2, valves V1, V2, V3, V4, V5, and V10, and compressors C1 and C2 thereby controlling their operations. As a result of this, the feed pump P1 is stopped, and the air compressor C1 is started. The first air compressor C1 in operation blows compressed air from the primary side of the membrane module 3 to the secondary side to squeeze out the water from the membrane module toward the secondary side, and agitate the surface of the filtration member with movement of bubbles (air strapping) thereby removing the sludge adhering to and settled on the membrane member surface. After air strapping operation for a predetermined period of time, the first air compressor C1 is stopped, and the second air compressor C2 is started to carry out air backwashing. The second air compressor C2 in operation blows compressed air from the secondary side of the membrane module 3 to the primary side thereby removing the sludge adhering to and settled on the primary side surface of the filtration member. After air backwashing operation for a predetermined period of time, the backwash pump P2 in operation conducts a part of the filtered water reserved in the filtered water tank 4 to the membrane module 3 from its outlet side through the line L4. The backwash pump P2 is started, and conducts the filtered water from the secondary side to the primary side of the membrane module thereby removing foreign substances (sludge) adhering to and settled on these surfaces. The sewage containing the removed foreign substances is sent to the wastewater treatment line L6. In the drainage treatment line L6, the sewage is treated in the order of the flocculation tank 5, precipitator 7, and ultraviolet irradiation reactor 8. In the flocculation tank 5, a predetermined flocculant (for example, polyaluminum chloride) is injected by a flocculent injection pump (not shown) thereby forming flocs. Subsequently, in the precipitator 7, largely grown flocs precipitate downward, so that the upper supernatant water in the precipitator 7 is precipitation-treated water cleared of most suspended solids. The precipitation-treated water is sent to the ultraviolet irradiation reactor 8 located downstream. The precipitation-treated water in the ultraviolet irradiation reactor 8 is subjected to ultraviolet irradiation during passage through the ultraviolet irradiation reactor 8, and then returned to the raw water tank 1 through the return line L8, and reused.

The action of the water treatment system 1 of the present embodiment is described below.

The membrane module 3 contains a polymer hollow fiber membrane or ceramic membrane having on its surface minute openings having a diameter of about 0.01 μm to 1.0 μm. Suspended solids contained in the raw water sent to the membrane module 3 are trapped at the membrane surface during passage through the minute openings. The suspended solids accumulate on the membrane surface during the filtration operation for about 30 minutes to 1 hour, whereby the minute openings are clogged with the suspended solids and the filtration flow rate deteriorates. Therefore, washing operation must be carried out on a regular basis. In the washing operation process, the feed pump P1 is stopped, and the air compressor C1 is started. The first air compressor C1 in operation blows compressed air from the primary side of the membrane module 3 to the secondary side to squeeze out the water from the membrane module toward the secondary side, and agitate the surface of the filtration member with movement of bubbles (air strapping) thereby removing the sludge adhering to and settled on the membrane member surface. After air strapping operation for a predetermined period of time, the first air compressor C1 is stopped, and the second air compressor C2 is started to carry out air backwashing. The second air compressor C2 in operation blows compressed air from the secondary side of the membrane module 3 to the primary side thereby removing the sludge adhering to and settled on the primary side surface of the filtration member. After air backwashing operation for a predetermined period of time, the backwash pump P2 in operation conducts a part of the filtered water reserved in the filtered water tank 4 to the membrane module 3 from its outlet side through the line L4.

In the flocculation tank 5 communicated with the drainage treatment line L6, a flocculant injected by a flocculant injection pump (not shown) and the sewage are thoroughly mixed by stirring with the stirrer 6, whereby the suspended solids heavily contained in the drainage are slowly flocculated to form flocs. The flocs contain some infectious microorganisms. In the subsequent precipitator 7, the flocs further grow to form large flocs and precipitate downward by gravitation. As a result of this, the supernatant water in the precipitator 7 is precipitation-treated water cleared of most suspended solids. However, dangerous infectious microorganisms cannot be completely removed by the flocculation and precipitation treatment. Therefore, the precipitation-treated water is sent to the ultraviolet irradiation tank 8 disposed downstream.

In the ultraviolet irradiation tank 8, the water is irradiated with ultraviolet light containing a wavelength of 253.7 nm which is effective at inactivating infectious microorganisms such as *Cryptosporidium, Giardia*, and *Escherichia coli*. The infectious microorganisms irradiated with ultraviolet light cannot proliferate any more because of damages at deoxyribonucleic acid (DNA) or ribonucleic acid (RNA) in their cells, and die out. The inactivation capacity of the ultraviolet irradiation tank 8 against the infectious microorganisms is, as expressed by the formula (1), determined by the ultraviolet light dose D (mJ/cm$^2$) defined by the product of the intensity of the irradiated ultraviolet light I (mW/cm$^2$) and the irradiation time t (s).

$$D = I \times t \quad (1)$$

3-log inactivation of chlorine-resistant pathogenic microorganisms such as *Cryptosporidium* and *Giardia* requires ultraviolet dose of D=10 (mJ/cm$^2$), and *Escherichia coli* requires 30 to 40 (mJ/cm$^2$). The term "inactivation 3-log" is an index indicating that the number of surviving bacteria with reference to the initial number of bacteria is 1/1000 or less.

The ultraviolet light intensity I which directly influence the ultraviolet dose D is highest on the surface of the ultraviolet lamp, and gradually decreases as distance from the lamp increases. The decrement of the ultraviolet intensity is calculated by substituting the ultraviolet transmittance UVT (%) of water flowing within the ultraviolet irradiation device and the distance Z (m) from the lamp surface into the following formula (2). The UVT in the formula (2) represents the ultraviolet transmittance (%) calculated by the following formula (3).

$$I = \left(\frac{U_v}{4\pi Z_0^2}\right) \times \exp(\ln(UVT/100) \times Z) \quad (2)$$

$$UVT = 100 \times 10^{A254} \quad (3)$$

wherein $U_V$ represents the ultraviolet output (mW) of the lamp, UVT represents the ultraviolet transmittance (%), A254 represents the ultraviolet absorbance at a wavelength of 254 (nm) when the optical path length is 1 (cm), $Z_0$ represents the distance (cm) from the lamp, and Z represents the transmissive distance (cm) of the ultraviolet light in the treated water. As described above, the intensity I of the irradiated ultraviolet light is influenced by the ultraviolet transmittance UVT of the water flowing within the ultraviolet irradiation tank 8, and decreases as the distance from the ultraviolet lamp increases. In the present embodiment, most suspended solids have been precipitated and removed in the backwashing drainage at the upstream of the ultraviolet irradiation tank 8.

Therefore, clear water having a high ultraviolet transmittance UVT is supplied, so that ultraviolet light is effectively used for the inactivation of infectious microorganisms.

Further, most of the water used for the backwashing of the membrane is returned to the raw water and reused as ultraviolet-disinfected safe water.

In the water treatment system according to the present embodiment, the washing drainage used for backwashing process of the filtration membrane is subjected to flocculation and precipitation treatment thereby separating and removing suspended solids, and the supernatant water is subjected to ultraviolet irradiation. As a result of this, efficient and reliable disinfection treatment is achieved with a lower power consumption than the case where water containing suspended solids or concentrated water after separation and removal treatments is subjected to ultraviolet irradiation.

Further, in the system according to the present embodiment, the infectious microorganisms irradiated with ultraviolet light in the ultraviolet irradiation reactor are inactivated, so that the treated water can be returned to the raw water and reused as safe water, whereby the effective utilization ratio of the raw water is improved.

Further, in the system according to the present embodiment, the backwashing drainage is subjected to flocculation and precipitation treatment, so that the treated water contains less suspended solids than the raw water and can be returned to the raw water. As a result of this, the suspension load on the filtration membrane is reduced, whereby the life of the membrane is increased.

Further, the suspended solids separated and removed in the precipitator are discarded as sludge or reused as building materials, so that little drainage is generated. As a result of this, recontamination of rivers and others with infectious microorganisms is prevented, and the environment load is reduced.

In a first embodiment of the present invention, a compressor blows air from the primary side to the secondary side of the membrane module 3 thereby conducting air strapping, and another compressor (second compressor) blows air from the secondary side to the primary side of the membrane module thereby conducting air backwashing. These operations may be conducted with a single compressor, where the same effect is achieved.

Second Embodiment

Figure 2:
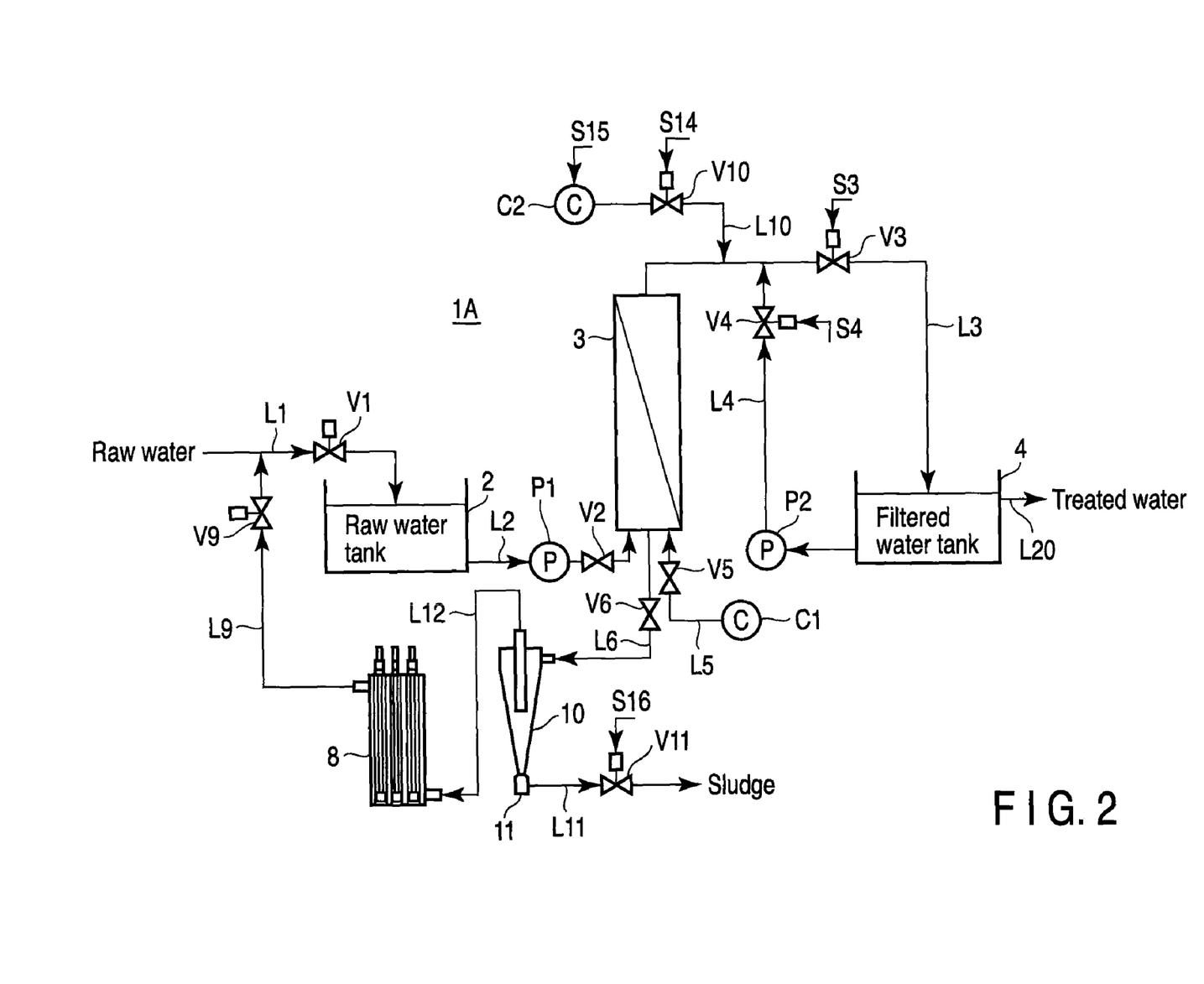
FIG. 2 is a block sectional view schematically showing the water treatment system according to a second embodiment of the present invention.

In the next place, the water treatment system according to a second embodiment of the present invention is described with reference to FIG. 2. Explanations of overlaps between the present embodiment and the above-described embodiment are omitted.

The system 1A in the present embodiment is different from the system 1 in the first embodiment in that a cyclonic solid-liquid separation device 10 is provided at the drainage treatment line L6 in place of the flocculation tank 5 and precipitator 7. The cyclonic solid-liquid separation device 10 is a centrifuge for physically and mechanically separating suspended solids in the sewage into solid and liquid components.

The inlet opened at the upper side of the cyclonic solid-liquid separation device 10 communicates with the drainage treatment line L6, into which the drainage from the membrane module 3 flows. The lowest portion of the cyclonic solid-liquid separation device 10 has a sludge collection vessel 11. The sludge collection vessel 11 accommodates the centrifuged solid component (slimy sludge), and is communicated with the line L11. The line L11 sends the solid component to a sludge storage tank (not shown). The uppermost portion of the cyclonic solid-liquid separation device 10 has an outlet communicating with a line L12. The centrifuged liquid component is sent to the ultraviolet irradiation reactor 8 through the outlet line L12, and returned to the raw water tank 2 through the return line L9 after disinfection treatment.

Raw water treatment using the water treatment system 1A in the present embodiment is described below.

The washing drainage generated by the backwashing process in the membrane module 3 is sent to a drainage treatment system. In the drainage treatment system, the washing drainage is subjected to centrifugation with a swirling flow in the cyclonic solid-liquid separation device 10 thereby isolating the solid component, more specifically suspended solids, once accumulated in the solid collection vessel 11 disposed at the bottom of the cyclonic separator device 10, and periodically collected through a sludge discharge valve V11 and treated as sludge. The treated water past the cyclonic separator device 10 is treated water having high ultraviolet light transmittance cleared of most suspended solids, and is sent to the ultraviolet irradiation reactor 8 provided downstream. In the ultraviolet irradiation tank 8, the water is irradiated with ultraviolet light emitted from the ultraviolet lamps included therein, whereby the infectious microorganisms remaining in the treated water are died out. Thereafter, the disinfected and treated water past the ultraviolet irradiation reactor 8 is returned to the raw water tank 2, and reused as detoxified water.

According to the present embodiment, suspended solids are separated and removed by the cyclonic solid-liquid separation device 10 in the drainage treatment system, which allows simplification of the treatment equipment, and marked reduction of the installation area taken by the drainage treatment line L6.

Further, according to the present embodiment, chemicals such as a flocculant is not necessary, whereby the cost of chemicals is reduced.

Further, according to the present embodiment, most part of water used for backwashing treatment of the filtration membrane is returned to the raw water tank and reused as detoxified water, whereby the effective utilization ratio of raw water is improved.

Third Embodiment

Figure 3:
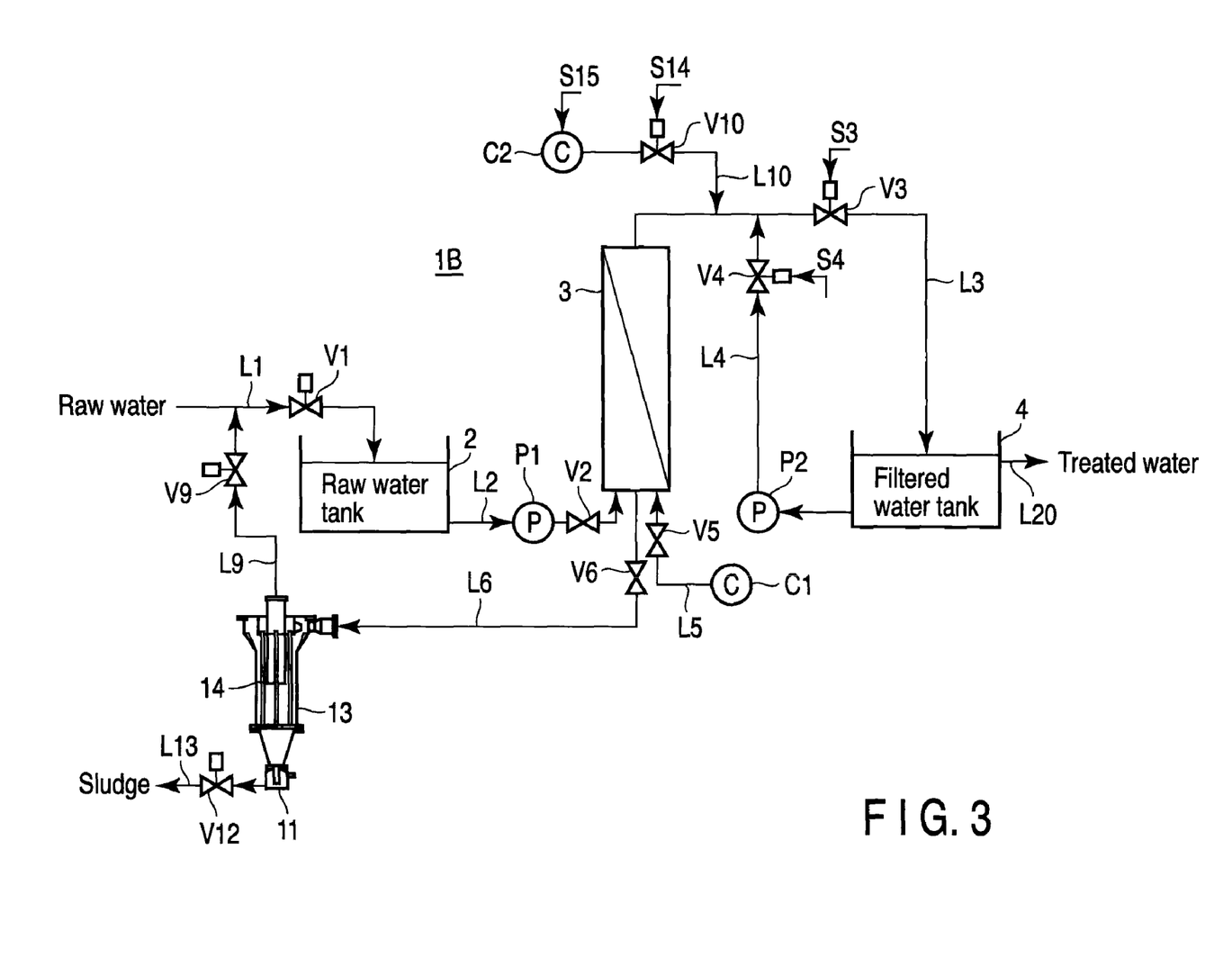
FIG. 3 is a block sectional view schematically showing the water treatment system according to a third embodiment of the present invention.

The water treatment system according to a third embodiment of the present invention is described below with reference to FIG. 3. Explanations of overlaps between the present embodiment and the above-described embodiment are omitted.

The water treatment system 1B in the present embodiment is different from the system 1A in the second embodiment in that a cyclonic ultraviolet irradiation reactor 13 including ultraviolet lamps in a cyclonic solid-liquid separation device is provided at the drainage treatment line L6 in place of the cyclonic solid-liquid separation device 10 and ultraviolet irradiation drainage 8. The cyclonic ultraviolet irradiation reactor 13 is a centrifuge for physically centrifuging suspended solids in the sewage into solid and liquid components, and at the same time, irradiating microorganisms in the drainage with ultraviolet light for disinfection. The cyclonic ultraviolet irradiation reactor 13 is substantially the same as the apparatus disclosed in FIG. 12 and its related description in JP-A. KOKAI Publication No. 2007-144386.

Raw water treatment using the water treatment system 1B in the present embodiment is described below.

The washing drainage generated by the backwashing process in the membrane module 3 is sent to the drainage treatment line L6. In the drainage treatment line L6, the washing drainage is subjected to centrifugation with a swirling flow in the cyclonic ultraviolet irradiation reactor 13 thereby isolating the solid component, more specifically suspended solids, and at the same time, irradiated with ultraviolet light by ultraviolet lamps 14 disposed within the cyclonic ultraviolet irradiation device. Subsequently, the solid component of the suspended solids containing infectious microorganisms in the washing wastewater are once accumulated in the solid collection vessel 11 disposed at the bottom of the cyclonic ultraviolet irradiation reactor 13, and periodically collected through a sludge discharge valve V12 and treated as sludge. The treated water past the cyclonic ultraviolet irradiation tank 13 is ultraviolet-disinfected water cleared of most suspended solids, and returned to the raw water tank 2 and reused.

According to the present embodiment, separation and removal of suspended solids by the cyclonic ultraviolet irradiation reactor 13, and disinfection treatment by ultraviolet irradiation are conducted with a single device in the wastewater treatment system, which allows marked simplification of the treatment equipment.

Further, according to the present embodiment, chemicals such as a flocculant is not necessary, whereby the cost of chemicals is reduced.

Further, according to the present embodiment, most part of water used for backwashing treatment of the filtration membrane is returned to the raw water tank and reused as detoxified water, whereby the effective utilization ratio of raw water is improved.

Further, according to the present embodiment, the infectious microorganisms in the sludge composed of the separated and removed suspended solids are subjected to disinfection treatment, whereby infection risks during sludge treatment are reduced.

Fourth Embodiment

Figure 4:
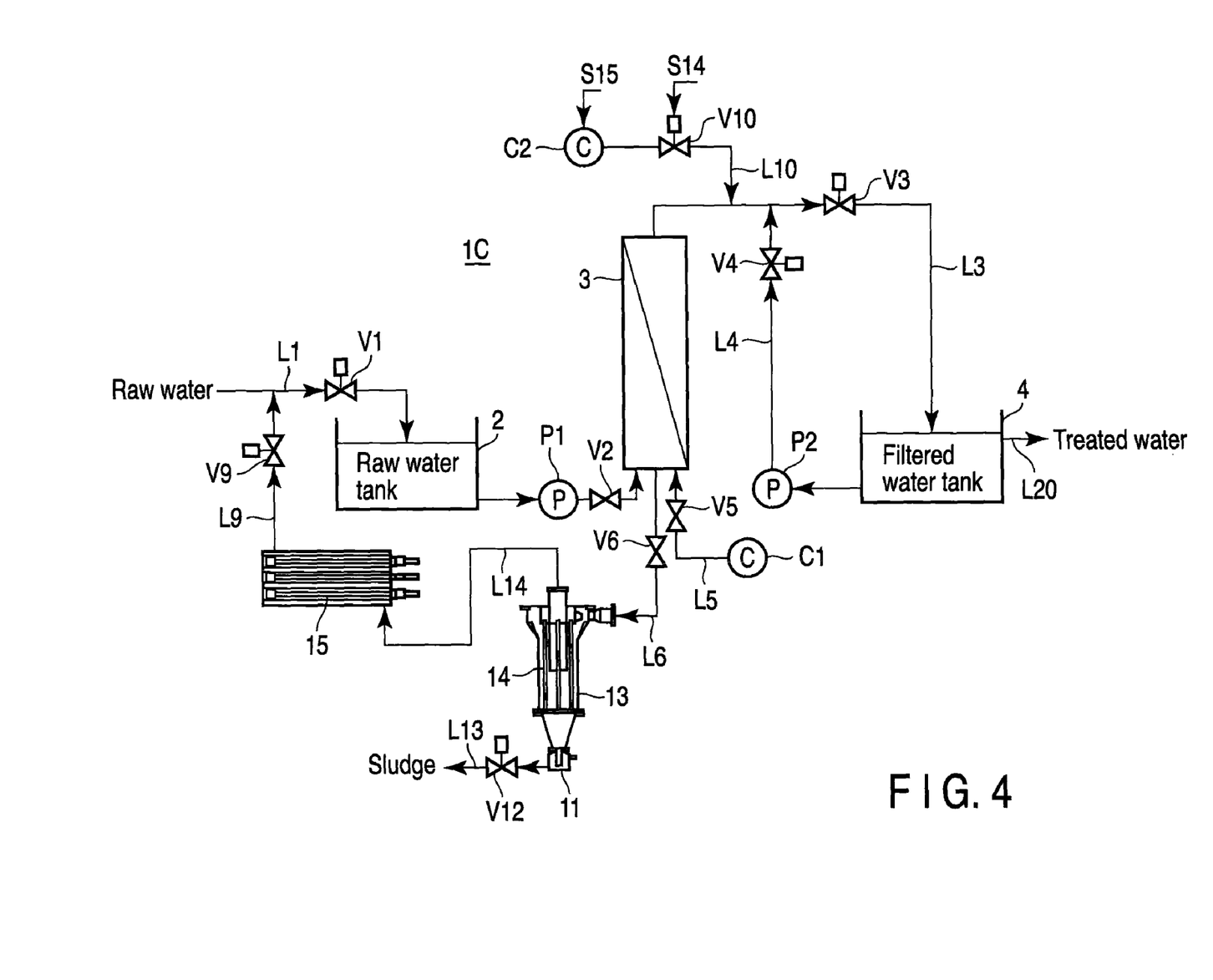
FIG. 4 is a block sectional view schematically showing the water treatment system according to a fourth embodiment of the present invention.

The water treatment system according to a fourth embodiment of the present invention is described with reference to FIG. 4. Explanations of overlaps between the present embodiment and the above-described embodiment are omitted.

The water treatment system 1C in the present embodiment is different from the system 1B in the third embodiment in that a second ultraviolet irradiation reactor 15 is disposed downstream of the cyclonic first ultraviolet irradiation reactor 13. The cyclonic first ultraviolet irradiation reactor 13 is substantially the same as the apparatus disclosed in FIG. 12 and its related description in JP-A. KOKAI Publication No. 2007-144386. The second ultraviolet irradiation tank 15 is substantially the same as the apparatus disclosed in FIG. 1 and its related description in JP-A. KOKAI Publication No. 2007-144386.

The cyclonic first ultraviolet irradiation reactor 13 has an inlet opened at the upper side, the inlet communicating with the drainage treatment line L6. The lowest portion of the first ultraviolet irradiation tank 13 has the same structure as that of the ultraviolet irradiation device in the third embodiment. The upper outlet of the first ultraviolet irradiation reactor 13 communicates with the inlet of the second ultraviolet irradiation reactor 15 through a line L14. The second ultraviolet irradiation reactor 15 has the substantially same structure as the ultraviolet irradiation reactor 8 in the second embodiment.

Raw water treatment using the water treatment system 1C in the present embodiment is described below.

The washing drainage generated by the backwashing process in the membrane module 3 is sent to the drainage treatment line L6. In the drainage treatment line L6, the washing drainage is subjected to centrifugation with a swirling flow in the cyclonic ultraviolet irradiation reactor 13 thereby isolating the solid component, more specifically suspended solids, and at the same time, irradiated with ultraviolet light by ultraviolet lamps 14 disposed within the cyclonic ultraviolet irradiation device. Subsequently, the solid component of the suspended solids containing infectious microorganisms in the washing drainage are once accumulated in the solid collection vessel 11 disposed at the bottom of the cyclonic ultraviolet irradiation drainage 13, and periodically collected through a sludge discharge valve V12 and treated as sludge. The treated water past the cyclonic ultraviolet irradiation reactor 13 is ultraviolet-disinfected primary treated water cleared of most suspended solids, which is sent to the second ultraviolet irradiation reactor 15, and subjected to secondary ultraviolet disinfection treatment. Then, the treated water past the second ultraviolet irradiation reactor 15 is returned to the raw water tank 1, and reused.

According to the present embodiment, separation and removal of suspended solids, and primary disinfection treatment with ultraviolet irradiation are conducted by the cyclonic ultraviolet irradiation reactor 13 at the drainage treatment line L6, and then residual infectious microorganisms are inactivating by the second ultraviolet irradiation reactor 15 to attain a safe level (3 log inactivation). The treated water is returned to the raw water tank and reused, whereby the effective utilization ratio of raw water is further improved.

Further, according to the present embodiment, the infectious microorganisms in the sludge composed of the separated and removed suspended solids are subjected to disinfection treatment, whereby infection risks during sludge treatment are reduced.

Fifth Embodiment

Figure 5:
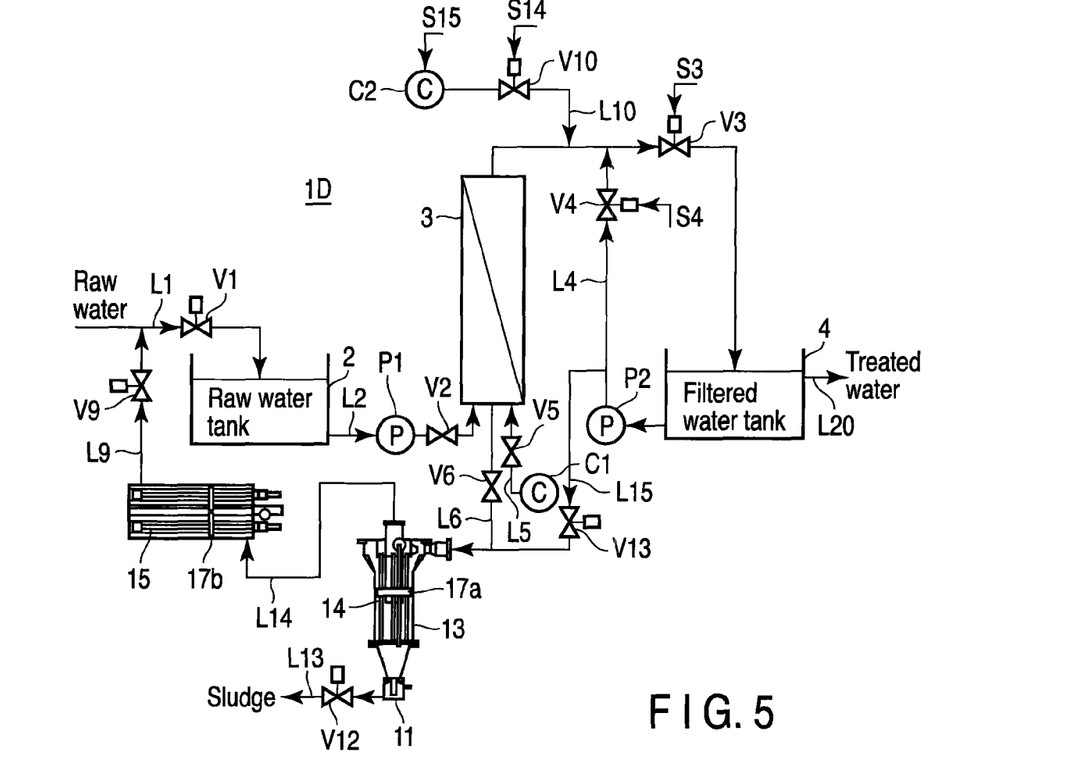
FIG. 5 is a block sectional view schematically showing the water treatment system according to a fifth embodiment of the present invention.

The water treatment system according to a fifth embodiment of the present invention is described with reference to FIG. 5. Explanations of overlaps between the present embodiment and the above-described embodiment are omitted.

The water treatment system 1D in the present embodiment is different from the system 1C in the fourth embodiment in that a bypass line L15 is provided, the bypass line L15 being branched from the line L4 at the ejection side of the backwash pump P2 and directly connected to the cyclonic ultraviolet irradiation reactor 13. Another difference is that cleaning devices 17a and 17b for cleaning the lamp protecting tubes are contained in the cyclonic ultraviolet irradiation reactor 13 and the second ultraviolet irradiation reactor 15. These cleaning devices 17a and 17b are substantially the same as the devices disclosed in FIG. 19 and its related description in JP-A. KOKAI Publication No. 2007-144386.

Raw water treatment using the water treatment system 1D in the present embodiment is described below.

The washing drainage generated by the backwashing process in the membrane module 3 is sent to the drainage treatment line L6. In the drainage treatment line L6, the washing drainage is subjected to centrifugation with a swirling flow in the cyclonic ultraviolet irradiation reactor 13 thereby isolating the solid component, more specifically suspended solids, and at the same time, irradiated with ultraviolet light by ultraviolet lamps 14 disposed within the cyclonic ultraviolet irradiation device. Subsequently, the solid component of the suspended solids containing infectious microorganisms in the washing drainage are once accumulated in the solid collection vessel 11 disposed at the bottom of the cyclonic ultraviolet irradiation drainage 13, and periodically collected through a sludge discharge valve V12 and treated as sludge. The treated water past the cyclonic ultraviolet irradiation reactor 13 is ultraviolet-disinfected primary treated water cleared of most suspended solids, which is sent to the second ultraviolet irradiation reactor 15, and subjected to secondary ultraviolet disinfection treatment. Then, the treated water past the second ultraviolet irradiation reactor 15 is returned to the raw water tank 2, and reused.

After completion of backwashing process of the membrane module 3, the operation is returned to normal filtration mode. In the present embodiment, the operation of the backwash pump P2 is further continued, and a part of the filtered water is directly fed to the cyclonic ultraviolet irradiation reactor 13 through the drainage treatment system washing line L15 under the control of the switching valve V13.

In the cyclonic ultraviolet irradiation reactor 13, the suspended solids remaining in and adhering to the tank are removed and washed off, and suspended solids adhering to the ultraviolet lamp protecting tubes are removed by the cleaning device 17a in operation. The removed suspended solids are subjected to solid-liquid separation by centrifugation with a swirling flow, and the solid component is once accumulated in the solid collection vessel 11 disposed at the bottom of the cyclonic ultraviolet irradiation reactor 13, and periodically collected through a sludge discharge valve V12 and treated as sludge. The treated water past the cyclonic ultraviolet irradiation reactor 13 is cleared of most suspended solids, sent as ultraviolet-disinfected primary treated water to the second ultraviolet irradiation reactor 15, and subjected to secondary ultraviolet disinfection treatment therein. In the second ultraviolet irradiation reactor 15, the cleaning device 17b in operation removes slightly adhering stains from the surfaces of the ultraviolet lamp protecting tubes. Then, the treated water past the second ultraviolet irradiation tank 15 is returned to the raw water tank 2, and reused.

According to the present embodiment, the surfaces of the protecting tubes protecting the ultraviolet lamps contained in the cyclonic ultraviolet irradiation reactor 13 and the second ultraviolet irradiation reactor 15 are periodically cleaned in the drainage treatment system washing process, whereby stains on the surfaces of the protecting tubes are removed, and the deterioration in the ultraviolet irradiation performance is prevented.

Further, according to the present embodiment, the water used in the drainage treatment system washing process is also subjected to ultraviolet irradiation in the cyclonic ultraviolet irradiation reactor 13 and second ultraviolet irradiation reactor 15, whereby the infectious microorganisms remaining in the suspended solids removed in the washing process are completely disinfected, and the water can be returned to the raw water tank 1 and reused. As a result of this, the effective utilization ratio of the raw water does not deteriorate.

Further, according to the present embodiment, the infectious microorganisms in the sludge composed of the separated and removed suspended solids are inactivating, whereby infection risks during sludge treatment are reduced.

Sixth Embodiment

Figure 6:
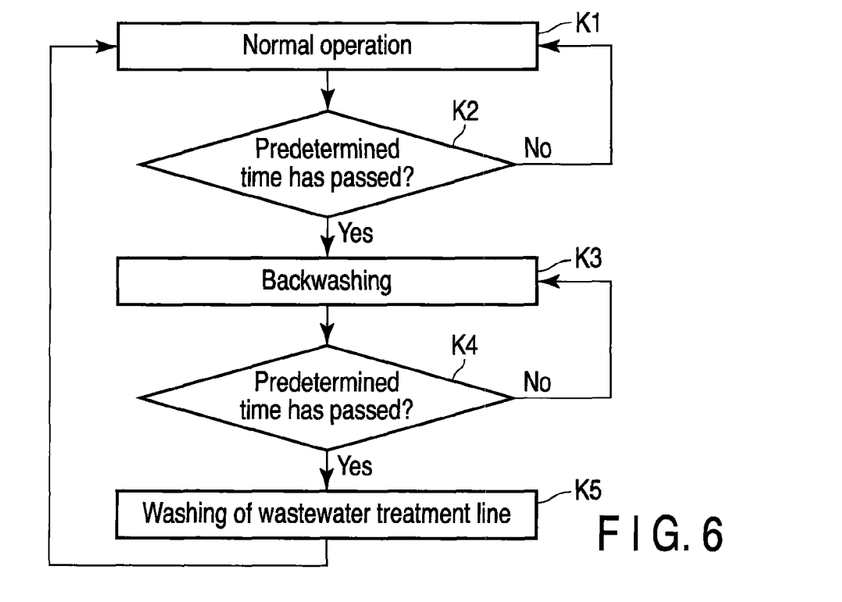
FIG. 6 is a flowchart showing the process of water treatment using the water treatment system of the present invention.

The water treatment system according to a sixth embodiment of the present invention is described with reference to FIG. 6. Explanations of overlaps between the present embodiment and the above-described embodiment are omitted.

The basic structure of the water treatment system in the present embodiment is same as the water treatment system in the fifth embodiment, except that, in the system in the present embodiment, the controller 9 for centrally controlling the whole system contains a plurality of timer circuits (not shown). These timer circuits includes, for example, a CR time constant circuit including a resistance R and a capacitor C connected in series. One end of the resistance R is connected to a control terminal of any device (for example, feed pump P1 or backwash pump P2) via an inverter, and the junction between the other end of the resistance R and one end of the capacitor C is connected to a gate terminal of a transistor. The other end of the capacitor C is connected to the ground GND.

The action of the water treatment system in the present embodiment is described below.

After normal operation of filtration treatment of raw water is conducted for a specified period of time in the order of the raw water tank 2→membrane module 3→filtered water tank 4 (process K1), the internal timer in the controller 9 is started to switch the normal operation to the backwashing operation (process K2). For example, once the power switch of the feed pump P1 is turned on, after a lapse of a predetermined time defined by the CR time constant of the first timer circuit, the output of the first timer circuit, more specifically the gate terminal of the transistor reaches the L level, whereby the transistor is turned off. As a result of this, electric current supply to the armature coil in the feed pump P1 is interrupted, whereby the feed pump P1 is stopped, and the supply of raw water from the raw water tank 2 to the filtration membrane module 3 is stopped. Thus, the pump P1 is stopped with a delay of a predetermined time after the activation of the feed pump P1. Further, the controller 9 sends signals S2 and S3 to close the valves V2 and V3, and sends signals S4, S5, S6, S9, and S14 to open the valves V4, V5, V6, V9, and V10, and send signals S12, S13, and S15 to start the backwash pump P2 and compressors C1 and C2. As a result of this, backwashing operation is conducted by conducting water in the order of the filtered water tank 4→membrane module 3→cyclonic ultraviolet irradiation reactor 13→second ultraviolet irradiation reactor 15→raw water tank 2 (process K3).

After the backwashing operation for a specified of time (process K3), the internal timer in the controller 9 is started to switch the backwashing operation to the drainage treatment line washing operation (process K4). For example, once the power switch of the backwash pump P2 is turned off, after a lapse of a predetermined time defined by the CR time constant of the second timer circuit, the output of the second timer circuit, more specifically the gate terminal of the transistor reaches the H level, whereby the transistor is turned on. As a result of this, electric current supply to the armature coil in the backwash pump P2 is resumed, whereby the backwash pump P2 is restarted. Thus, the backwash pump P2 is restarted with a delay of a predetermined time after the stopping of the backwash pump P2. The washing operation for the drainage treatment line L6 conducts a washing of drainage treatment means at least once after backwashing of the separation membrane during operation of the membrane filtration (process K5). After completion of the drainage treatment line washing operation, the process flow returns to the normal operation of the process K1.

According to the present invention, suspended solids concentrated by the separation membrane are removed and detoxified to allows the reuse of the backwashing water, whereby the effective utilization ratio of raw water is improved.

Further, according to the present invention, the load on the separation membrane is reduced, whereby the maintenance cost for the separation membrane is reduced.

Further, according to the present invention, the amount of discharged drainage is reduced, whereby the environment load is reduced, and recontamination of rivers and others by infectious microorganisms is prevented.

The present invention is described above with reference to various embodiments, but the present invention is not limited to these embodiments, and various modifications and combinations thereof may be made.

What is claimed is:

1. A water treatment system for producing tap water or industrial water from raw water such as river water, lake water, and groundwater, the system comprising:
   a raw water tank which stores raw water;
   a filtration membrane module which receives raw water from the raw water tank and has a filtration membrane for separating and removing foreign substances from the raw water;
   a feed pump which is provided between the raw water tank and the filtration membrane module, and feeds raw water from the raw water tank to the filtration membrane module;
   a filtered water tank which receives and temporarily reserves filtered water transmitted through the filtration membrane of the filtration membrane module, and sends out a supernatant as treated water;
   a backwash pump which is provided between the filtered water tank and the filtration membrane module, and flows filtered water backward from the filtered water tank to the filtration membrane module;
   a valve and a channel which are provided between the filtered water tank and the filtration membrane module, and switch the direction of the water flow between the forward and reverse directions;
   a control means for suspending the supply of raw water from the raw water tank to the filtration membrane module, switching the valve and channel to the reverse direction, making the backwash pump to supply filtered water from the filtered water tank to the filtration membrane module thereby backwashing the filtration membrane;
   a cyclonic ultraviolet irradiation reactor provided between the filtration membrane module and the raw water tank, for treating backwashing drainage generated by backwashing of the filtration membrane, and returning the water to the raw water tank;
   a second ultraviolet irradiation reactor provided between the filtration membrane module and the raw water tank, for treating backwashing drainage generated by backwashing of the filtration membrane, and returning the water to the raw water tank; and
   a bypass line which is branched from a line at an ejection side of the backwash pump, and merges with an incurrent line of the cyclonic ultraviolet irradiation reactor bypassing the filtration membrane module.

2. The water treatment system according to claim 1, wherein the cyclonic ultraviolet irradiation reactor and the second ultraviolet irradiation reactor each comprise an ultraviolet lamp emitting ultraviolet light including a wavelength of 253.7 nm.

3. The water treatment system according to claim 2, wherein the ultraviolet lamp is accommodated in a protecting tube consisting of quartz glass for isolating and protecting the periphery of the lamp from the outside fluid.

4. The water treatment system according to claim 3, wherein the cyclonic ultraviolet irradiation reactor and the second ultraviolet irradiation reactor each have a cleaning device for cleaning the outer surface of the ultraviolet lamp protecting tube.

5. The water treatment system according to claim 1, wherein the control means controls the time of washing with the cyclonic ultraviolet irradiation reactor at least once after backwashing of the filtration membrane during the operation of membrane filtration.

\* \* \* \* \*